United States Patent [19]

Malerba et al.

[11] 4,189,626
[45] Feb. 19, 1980

[54] ELECTRONIC TONE RINGER FOR TELEPHONE SETS

[75] Inventors: Oreste Malerba, Trofarello-Torino; Antonio Neri, Baranzola-Montevarchi-Arezzo, both of Italy

[73] Assignee: CSELT - Centro Studi e Laboratori Telecomunicazioni S.p.A., Turin, Italy

[21] Appl. No.: 916,354

[22] Filed: Jun. 16, 1978

[30] Foreign Application Priority Data

Jun. 20, 1977 [IT] Italy ............................... 68421 A/77

[51] Int. Cl.² .............................................. H04M 1/26
[52] U.S. Cl. .................................................... 179/84 T
[58] Field of Search .............. 179/84 R, 84 T, 84 VF, 179/2 A

[56] References Cited

U.S. PATENT DOCUMENTS

| 3,603,740 | 9/1971 | Cambridge | 179/84 T |
| 3,808,379 | 4/1974 | Lind | 179/84 T |
| 4,042,786 | 8/1977 | Freimanis | 179/84 R |

FOREIGN PATENT DOCUMENTS 1245813  9/1971  United Kingdom ............... 179/84 T

*Primary Examiner*—Bernard Konick
*Assistant Examiner*—Joseph A. Popek
*Attorney, Agent, or Firm*—Karl F. Ross

[57] ABSTRACT

A tone ringer for a telephone set, responsive to both low-voltage call signals of relatively high frequency and high-voltage call signals of a relatively low frequency, comprises an active filter connected across a line loop for transmitting the low-frequency call signals in attenuated form and the high-frequency call signals in amplified form to a storage capacitor in a signal detector which in the presence of either type of call signal accumulates a sufficient charge to activate a threshold circuit in that detector. A normally blocked current source, connected across the line loop via a diode bridge, is unblocked by this threshold circuit to energize a tone generator working into an electro-acoustic transducer.

9 Claims, 3 Drawing Figures

ELECTRONIC TONE RINGER FOR TELEPHONE SETS

FIELD OF THE INVENTION

Our present invention relates to tone ringers for use in telephone sets and more particularly to a tone ringer designed to receive call signals both from conventional electromechanical exchanges and from electronic exchanges.

BACKGROUND OF THE INVENTION

At present, telephone traffic is controlled either by electromechanical or by electronic exchanges. As concerns call signals sent from such exchanges to the subscribers, significant differences exist. Thus, electromechanical exchanges generally send a call signal with a rather high voltage level (of the order of 100 volts) at a relatively low frequency of 25 Hz, this signal being capable of directly actuating a conventional tone ringer of electromechanical type. Electronic exchanges, on the other hand, generally emit a voice-band call signal whose frequency range is 400 to 500 Hz and whose voltage level is very low (of the order of a few volts); hence, the latter signal cannot directly excite an electromechanical tone ringer.

Consequently, in telephone sets connected to electronic exchanges, a suitable electronic tone ringer is provided. Such a tone ringer, however, is not actuatable by the 25-Hz call tone of electromechanical exchanges.

If telephone sets were equipped with tone ringers compatible with both types of call signals referred to, expensive modifications in the exchanges and/or in associated telephone sets could be avoided when an electromechanical exchange is replaced by a new electronic exchange.

A number of tone ringers are known in the art which, for operating in both cases, require that the call signal coming from the exchange be accompanied by a polarity inversion of the d-c voltage present on the subscriber's line loop; to energize such a tone ringer, either the call signal used in traditional exchanges or a d-c voltage present on the line loop can be utilized, provided the polarity is inverted upon the arrival of a voice-band call signal from an electronic exchange.

Obviously, this polarity inversion entails higher costs and increased circuit complexity in the telephone exchange.

British Pat. No. 1,245,813 describes a tone ringer utilizing a particular electronic circuit designed to act as a selective amplifier for call signals coming from electronic exchanges and as an oscillator for call signals coming from electromechanical exchanges.

As appears from the description of that patent, the entire tone-ringer circuit is permanently energized by the subscriber's loop and no means are provided to limit current absorption in the absence of a call signal. Moreover, the circuit operates, in the absence of a call signal, as an amplifier permanently inserted in the subscriber's loop, and thus it continuously amplifies all the noises of various nature that may be present, thereby producing in the associated electro-acoustic transducer continuous series of rings and sounds which are very annoying.

Another inconvenience of this prior system is the dissimilar response of the circuit to the two types of calls. In the presence of a call coming from an electromechanical exchange, a sound obtained by the modulation at 25 Hz of the normal operating frequency of the local oscillator is produced; on the other hand, in the presence of a call signal coming from an electronic exchange a nonmodulated sound is generated, unless such modulation is performed in the exchange on the call signal.

OBJECTS OF THE INVENTION

An object of our present invention is to provide a tone ringer which does not require any polarity inversion on the subscriber's line loop for its operation but, on the contrary, is protected against accidental polarity inversions; which is directly energized by the line loop with limited power dissipation in the absence of a call signal; which is protected against noises present on the telephone line; and which is able to generate a sound with constant characteristics independently of the type of call signal.

Another object of the present invention is to provide means for reliably detecting and identifying a call signal so as to filter out any possible spurious signal.

SUMMARY OF THE INVENTION

A tone ringer according to our invention comprises a normally blocked current source connected across the line loop together with filter means having a pass band which encompasses the frequencies of the two call signals discussed above, namely the lower-voltage signal of relatively high frequency from an electronic exchange and the higher-voltage signal of relatively low frequency from an electromechanical exchange. A charge accumulator connected to the filter means develops a progressively rising voltage in the presence of a call signal, this voltage activating an associated threshold circuit upon attaining a predetermined level. The threshold circuit, on being thus activated, unblocks the normally blocked current source which then energizes a tone generator connected thereto.

According to a more particular feature of our invention, the filter means connected across the line loop comprises an active filter with an operational amplifier whose gain is higher at the frequency (e.g. 400 to 500 Hz) of the lower-voltage call signal than at the frequency (25 Hz) of the higher-voltage call signal.

In the embodiment specifically described hereinafter, the charge accumulator comprises a storage capacitor connected in series with a charging diode and shunted by a discharge resistor; the associated threshold circuit comprises a normally nonconductive control transistor with a base and an emitter connected in series with a Zener diode across the storage capacitor of the charge accumulator.

BRIEF DESCRIPTION OF THE DRAWING

These and other features of the present invention will become clearer from the following description of a particular embodiment thereof, given by way of example and not in a limiting sense, reference being made to the annexed drawing in which.

SPECIFIC DESCRIPTION

Figure 1:
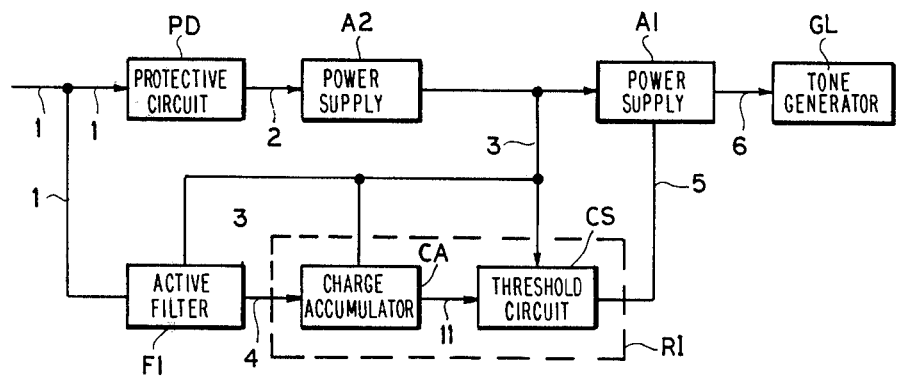
FIG. 1 is a block diagram of a tone ringer according to our invention.
Figure 3:
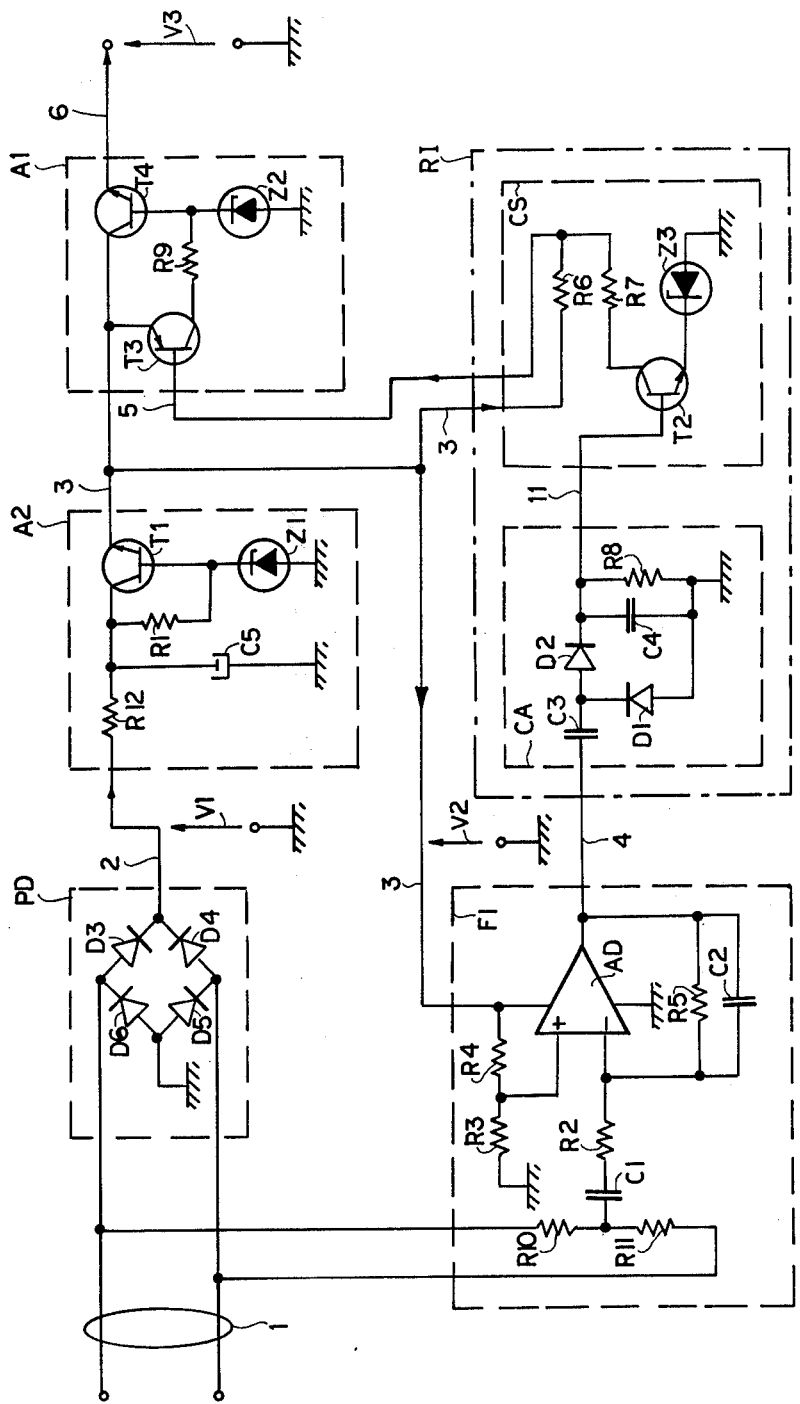
FIG. 3 is a detailed circuit diagram of other blocks of FIG. 1.

In FIG. 1, reference 1 denotes a subscriber's line loop connected to the input of a circuit PD protecting other components against possible polarity inversions present on loop 1. Circuit PD may consist, for instance, of a simple diode bridge as shown in FIG. 3.

Reference A2 denotes a power supply or current source, to be described in detail with reference to FIG. 3, whose input is connected to the output of protective circuit PD through a wire 2. Source A2 is designed to supply a stabilized voltage to blocks F1, RI and A1, to which it is connected through a wire 3 and which will be discussed hereinafter.

Block F1 (FIG. 1) is an active band-pass filter basically consisting of a frequency-selective amplifier. This filter serves to amplify a call signal, generally of 500 Hz, coming through the line loop 1 from an electronic exchange and to attenuate a call signal, generally of 25 Hz, coming from an electromechanical exchange through the same loop 1. This filter will also be described in detail with reference to FIG. 3.

Block RI is a detector for periodic signals of 25 Hz and 500 Hz. This detector, which will be described in detail with reference to FIG. 3, basically consists of a charge accumulator CA and of a threshold circuit CS. Accumulator CA has an input connected to filter F1 by a wire 4.

Block A1 is another voltage-stabilizing current source operated by a signal coming from component RI on a wire 5 when this component detects a call signal. Voltage stabilizer A1 is energized by source A2 through wire 3 (as already stated) but, when in rest condition (i.e. when not activated), absorbs no current from that wire. An output lead 6 of circuit A1 extends to a signal generator GL.

Figure 2:
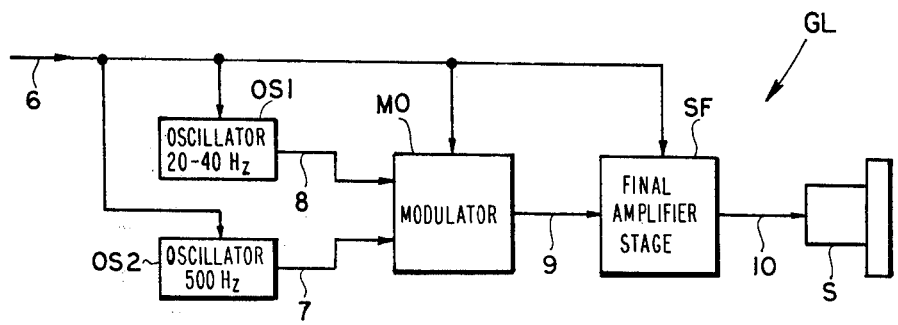
FIG. 2 is a detailed diagram of a tone generator shown as a block in FIG. 1.

In FIG. 2 we have shown this signal generator as comprising two conventional oscillators OS1, OS2 designed to generate two signals of suitable frequency on respective leads 8 and 7; in the described embodiment, oscillator OS1 may operate in a range of 20 to 40 Hz, as chosen by the subscriber, and oscillator OS2 has an operating frequency of 500 Hz.

Reference MO denotes a conventional circuit which modulates the high-frequency signal of 500 Hz, received through wire 7 from oscillator OS2, by the lower-frequency signal received through wire 8 from oscillator OS1.

From experimental investigations carried out by P. D. Bricker et al, whose results have been reported in IEEE Transactions on Audio and Electroacoustics, March 1970, in a paper entitled "Subjective Assessment of Computer-Simulated Telephone Calling Signals", it appears that such a modulated tone is more pleasant and may be easier to detect than a single-frequency sound. Moreover, as the frequency of the modulating signal may be manually adjusted, it allows a subscriber having several telephone sets near one another to recognize immediately which set emits the ringing tone.

A conventional final power stage SF receives the output signal of modulator MO on a wire 9, amplifies it and transfers it to a transducer S on a wire 10.

In the described embodiment of our invention, the gain of the final stage may be manually adjusted in order to allow the subscriber to vary the ringing intensity as desired.

Components PD, A1, A2, F1, CA and CS are shown in FIG. 3 to comprise a number of transistors T1, T2, T3, T4, Zener diodes Z1, Z2, Z3, ordinary diodes D1, D2, D3, D4, D5, D6, resistors R1 to R12, capacitors C1, C2, C3, C4, C5, and an operational amplifier AD whose mode of operation will be discussed hereinafter.

Transistor T1 of voltage stabilizer A2 has its emitter connected to the collector of transistor T4 forming part of current source A1, their junctions being connected to an extension of output lead 3.

References V1, V2 and V3 denote the d-c voltages, measured with respect to ground, of wires 2, 3 and 6, respectively.

We shall now describe, with reference to FIGS. 1, 2 and 3, the operation of the tone ringer according to our invention.

In the absence of call signals, line loop 1 (FIGS. 1, 3) always carries, as is known, a d-c voltage V1 supplied by the telephone exchange; usually such voltage is of the order of some tens of volts.

Component PD, protecting current source A2 against possible polarity inversions on the subscriber's loop, is a bridge circuit consisting of diodes D3–D6.

D-c voltage V1, duly smoothed by the low-pass filter formed of impedances R12 and C5, energizes the collector of transistor T1, biased by resistor R1 and Zener diode Z1; hence, on its emitter connected to wire 3 there is present a regulated unipolar voltage V2 lower than voltage V1, depending on the threshold voltage of Zener diode Z1.

Voltage V2 reaches, through wire 3, blocks F1, RI and Al.

Owing to capacitor C1 of filter F1, d-c voltage V1 cannot reach the inverting input of amplifier AD forming part of that filter which therefore does not participate in this phase marked by the absence of a call signal, although it is energized by source A2 via wire 3. This means that on wire 4, connected to the output of amplifier AD, no signal is present.

As a consequence, the potential on the ungrounded terminal of storage capacitor C4 in charge accumulator CA is zero, transistor T2 is inhibited so that no voltage drop exists across resistor R6 in series with its collector, on wire 5 there is present the same voltage V2 as on wire 3, transistor T3 is inhibited since its base and emitter are at the same potential in the absence of such a voltage drop, and transistor T4, lacking the necessary base bias, is also inhibited.

Under these conditions voltage V3 is zero, tone generator GL (FIG. 1) is not energized and no sound is emitted by transducer S.

Let us now assume that a ringing signal of 25 Hz, coming from an electromechanical exchange, arrives on line loop 1 (FIG. 3).

This signal, in the range of one-hundred volts, arrives superimposed on the d-c loop voltage at the inputs of diode bridge PD and active filter F1. Bridge PD rectifies the ringing signal and sends a pulsating current to voltage stabilizer A2, to which it is connected by wire 2; circuit A2 smooths such a current and emits on its output lead 3 a perfectly regulated d-c voltage V2.

Owing to the presence of capacitor C1 in the input of filter F1, only the a-c signal of 25 Hz is transmitted, via resistors R10, R11 and R2, to the inverting input of operational amplifier AD. As the feedback network of this amplifier including impedances C2 and R5 establishes a maximum gain at 500 Hz, the 25-Hz signal is transferred in attenuated form to the output terminal connected to wire 4.

Resistors R3 and R4 are designed to supply a suitable biasing voltage to the noninverting input of amplifier AD.

The 25-Hz signal so attenuated is transferred by wire 4 to detector RI whose charge accumulator CA includes diodes D1, D2, capacitors C3, C4 and resistor R8 whereas its threshold circuit CS comprises control transistor T2, Zener diode Z3 and resistors R6 and R7.

The time constant of accumulator CA, determined by impedances C3, C4 and R8, is such that storage capacitor C4, charged through diode D2, builds up a progressively increasing terminal voltage consisting of a sequence of steps which correspond to the cycles of the 25-Hz signal.

As soon as the charging voltage of capacitor C4, connected to the base of control transistor T2 by wire 11, exceeds the threshold determined by Zener diode Z3 in series with its emitter, transistor T2 begins to conduct.

This charging voltage levels off at the threshold of circuit CS for the whole duration of the ringing signal and quickly decreases when the signal terminates, according to the time constant of the combination of capacitor C4 and shunt resistor R8. Thus, the voltage V2 normally existing at the junction of resistors R6 and R7, and therefore also on wire 5, is changed during conduction of transistor T2 to the level determined by the voltage divider formed by resistor R6 and the series of elements R7, T2 and Z3.

Transistor T3, whose base is connected to wire 5, begins to conduct; the collector current flowing through resistor R9 and Zener diode Z2 provides the proper base bias for transistor T4. As a result, the voltage V1 on the emitter of transistor T4 and on wire 6 rises from zero to the level determined by Zener diode Z2; block GL (FIG. 1) is thus energized to generate a modulated signal which is audibly reproduced by electro-acoustic transducer S.

The case will now be investigated in which a call signal of 500 Hz, coming from an electronic exchange, arrives on line loop 1 (FIG. 3). This signal, in the range of several volts, passes unchanged through diode bridge PD which forms an open path owing to the d-c voltage present on loop 1; regulated power supply A2 operates as previously described for the signal of 25 Hz, maintaining its output voltage V2 constant, regulated and independent of the presence of the 500-Hz signal.

From line loop 1 the call signal is also transferred to filter F1 which in this case operates as an amplifier so as to deliver a voltage level of suitable value for the detector RI.

Components C1, C2, R2, R5, R10 and R11 form the aforementioned feedback network designed so that operational amplifier AD has its maximum gain with signals at 500 Hz. In any case, resistors R3 and R4 provide the requisite bias at the noninverting input of amplifier AD.

The 500-Hz signal so amplified by filter F1 is then transferred through wire 4 to detector RI, where it is processed as already described for the signal of 25 Hz.

In the same way as before, accumulator CA generates a stepped charging voltage which, as soon as it reaches the threshold level of circuit CS, causes transistors T2, T3 and T4 to become conducting.

Voltage V3, present on wire 6, goes from its normal level of zero, present in the absence of call signals, to the level imposed by Zener diode Z2 and energizes tone generator GL (FIG. 1) to activate the electro-acoustic transducer S.

In case spurious noises are present on line loop 1 (FIG. 3), filter F1 acts as a first barrier by drastically attenuating all the signals outside the pass band centered on the frequency of 500 Hz. A further barrier is constituted by the detector RI which recognizes periodic signals but does not respond to noise pulses. Accumulator CA increments the charging voltage of capacitor C4 by one step with each cycle of the call signal present at its input until the threshold potential of circuit CS is reached. In the case of a periodic noise pulses, this threshold potential may not be reached as the time constant of the discharge path of capacitor C4 is such that the accumulated charge will not increase sufficiently in the presence of well-separated random signals.

We claim:

1. A tone ringer for a telephone set receiving call signals from an exchanger over a line loop normally energized with d-c voltage, said call signals including a lower-voltage signal of relatively high frequency and a higher-voltage signal of relatively low frequency, comprising:

a normally blocked current source connected across said line loop;

filter means with a pass band encompassing the frequencies of said call signals connected across said line loop;

charge-accumulating means connected to said filter means for developing a progressively rising voltage in the presence of a call signal;

a threshold circuit connected to said charge-accumulating means for activation by said progressively rising voltage upon the same attaining a predetermined level, said current source being connected to said threshold circuit for unblocking upon activation of the latter; and a tone generator connected to said current source for energization thereby.

2. A tone ringer as defined in claim 1 wherein said filter means comprises an active filter including an operational amplifier with a higher gain at said relatively high frequency than at said relatively low frequency.

3. A tone ringer as defined in claim 2 wherein said operational amplifier has a maximum gain at substantially 500 Hz and attenuates oscillations of 25 Hz.

4. A tone ringer as defined in claim 1, 2 or 3 wherein said charge-accumulating means comprises a storage capacitor in series with a charging diode and a discharge resistor shunting said storage capacitor.

5. A tone ringer as defined in claim 4 wherein said threshold circuit comprises a normally nonconductive control transistor with a base and an emitter connected in series with a Zener diode across said storage capacitor.

6. A tone ringer as defined in claim 5 wherein said current source is connected to said line loop through a voltage stabilizer, said control transistor having a collector connected to an output lead of said voltage stabilizer via a series resistor, said current source including another transistor with an emitter and a base respectively connected to said output lead and to said series resistor for conducting only in the presence of a voltage drop across said series resistors.

7. A tone ringer as defined in claim 6 wherein said voltage stabilizer and said current source comprise two further transistors connected in series, each of said further transistors having a base lead including a respective Zener diode, said output lead being connected to a junction between a collector of one and an emitter of the other of said further transistors.

8. A tone ringer as defined in claim 6, further comprising a diode bridge inserted between said line loop and said voltage stabilizer.

9. A tone ringer as defined in claim 1, 2 or 3 wherein said tone generator comprises two oscillators of different operating frequencies and a modulator connected to said oscillators for modulating the higher one of said operating frequencies with the lower one of said operating frequencies.

* * * * *